April 27, 1926.

R. M. CRAWFORD

RECOVERY OF PHENOLS AND CRESOLS

Filed April 16, 1925

1,582,512

INVENTOR
Robert M. Crawford
by his attorneys
Byrnes, Stebbins & Parmelee

Patented Apr. 27, 1926.

1,582,512

UNITED STATES PATENT OFFICE.

ROBERT M. CRAWFORD, OF PITTSBURGH, PENNSYLVANIA.

RECOVERY OF PHENOLS AND CRESOLS.

Application filed April 16, 1925. Serial No. 23,711.

*To all whom it may concern:*

Be it known that I, ROBERT M. CRAWFORD, a citizen of the United States, residing at Pittsburgh, in the county of Allegheny and State of Pennsylvania, have invented a new and useful Improvement in the Recovery of Phenols and Cresols, of which the following is a full, clear, and exact description, reference being had to the accompanying drawings, forming part of this specification.

The present invention relates to the recovery of phenol and cresols from their containing oils, and more particularly to a continuous process of selective recovery.

The phenol and cresols are recovered from their containing oils, such as tar acid oils, or from toluol, benzol, etc., containing the phenol and cresols, by washing the oil with alkaline solutions, usually of sodium hydroxide. When phenol and cresols are treated with an alkali, such as sodium hydroxide, the phenol and cresols are converted into alkali phenolate and cresylate, which are water soluble.

Advantage is taken of the fact that phenol is much more acid in character than the cresols to secure a selective recovery of the phenol and cresols. If phenol or an oil containing phenol is washed with a solution containing an alkali cresylate, for example, sodium cresylate, the phenol will replace the cresol and form sodium phenolate.

In my process, the phenol and cresols are selectively recovered by first washing the oil with an alkaline solution to recover the phenol as an alkali metal phenolate, and thereafter, washing the oil with a second alkaline solution to recover the cresols as alkali metal cresylate. This is preferably carried out in the apparatus shown in the drawings by continuously passing the oil countercurrent through the respective alkaline solutions by injecting the oil in the form of a submerged spray into the bottom of reactors, through which currents of the alkaline solutions are descending.

In the drawings which illustrate the preferred form of apparatus for carrying out the invention:

Figure 1:
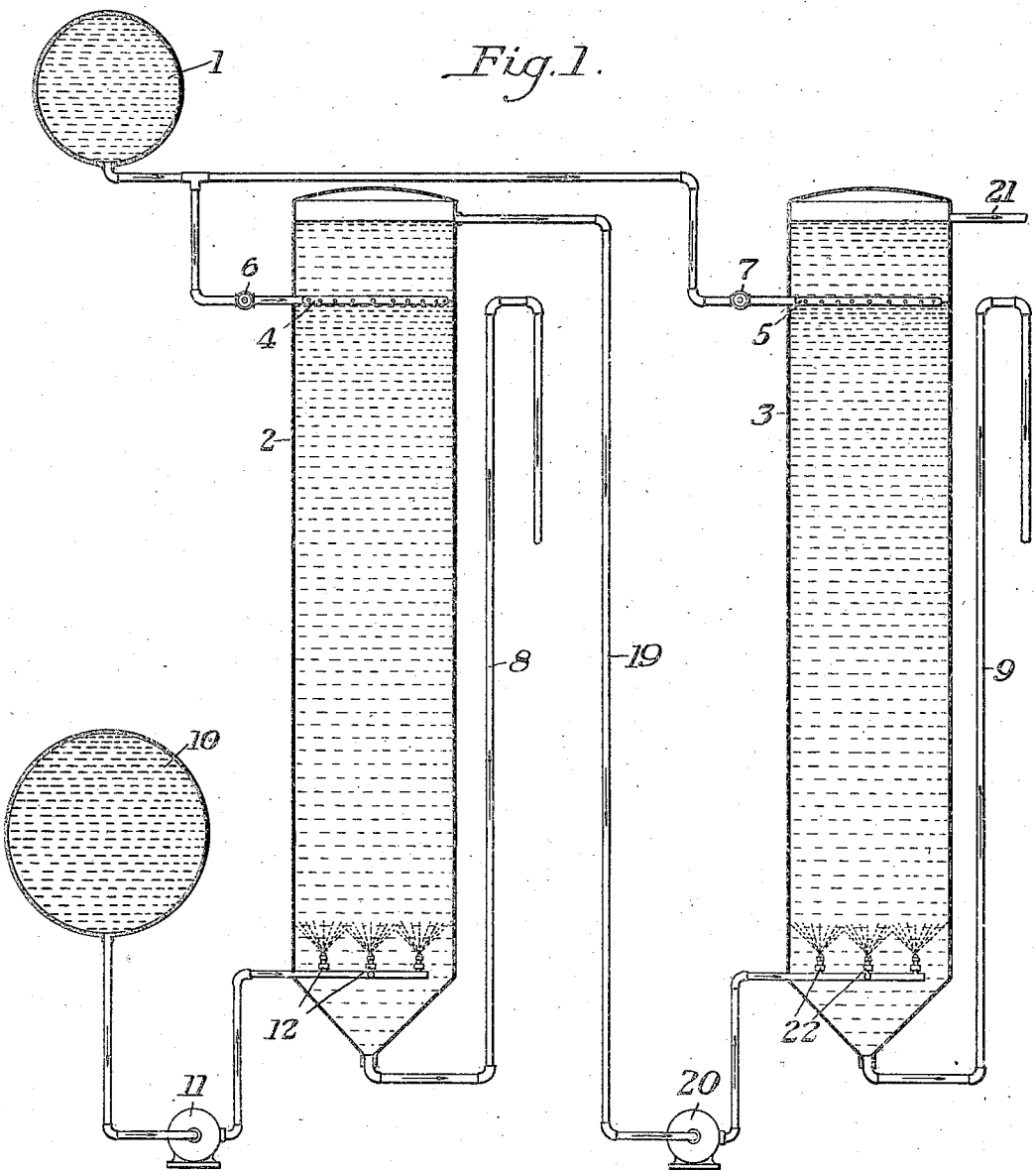
Figure 1 is a diagrammatic view in elevation.
Figure 2:
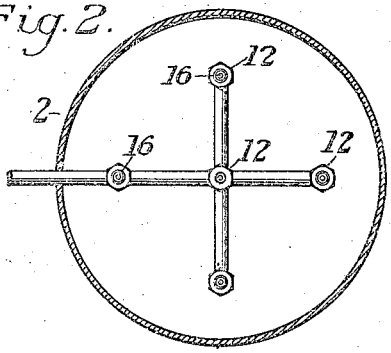
Figure 2 is a plan view of one of the spray heads.

The process will now be explained with particular reference to the operation of the illustrated apparatus, it being understood, however, that the process may be carried out in other types of apparatus.

An alkaline solution, preferably a sodium hydroxide solution, is stored in the tank 1, from which it is piped to the reactors 2 and 3. The caustic soda solution is introduced into the tops of the reactors by rings 4 and 5 of perforated pipe. Suitable valves 6 and 7 are provided for regulating the admission of the caustic soda solution.

Overflow pipes 8 and 9 are provided for the reactors 2 and 3, respectively, and serve to maintain the desired level of the alkaline solution therein.

Figure 3:
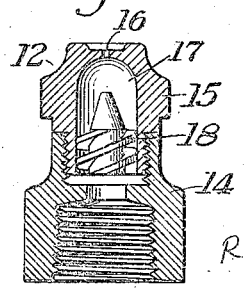
Figure 3 is a detail section through one of the spray nozzles.
Figure 4:
Figure 4 is a perspective view of the spiral center piece of one of the spray nozzles.

The oil containing the phenol and cresols is stored in a tank 10, from which it is pumped by pump 11 under pressure to the spray nozzles 12 in the bottom of the reactor 2. There are preferably a number of these spray nozzles, the details of which are shown in Figures 3 and 4. The nozzle consists of a socket 14, threaded to connect with one of the delivery pipes. A nozzle piece 15 is threaded into the socket 14 and is provided with a small nozzle opening 16. The nozzle piece 15 has a circular recess 17, in which is held a helical screw center piece 18. This helical center piece is held stationary in the nozzle piece 15. The oil passing through the threads of this screw is given a rapid whirling motion, so that as it is ejected through the nozzle 16, it breaks up into a cone of fine spray particles. I have found that by employing this type of nozzle, together with a sufficient pressure, usually in the neighborhood of 15 lbs. per sq. in. above the static head of the liquid in the reactor, I am enabled to inject the oil into the bottom of the reactor in the form of a cone of spray in the neighborhood of a foot in diameter. The spray droplets are usually somewhere in the neighborhood of a millimeter in diameter.

These spray droplets of the oil rise through the caustic soda solution in the form of a fine mist or spray exposing the maximum surface for the absorption of the phenol and cresols from the oil. The caustic soda solution is passing downwardly through the reactor 2 in countercurrent to the rising spray of oil, which conduces to the greatest efficiency in extraction.

Since phenol is more acid in its reaction than the cresols, sodium phenolate solution only can exist in the lower regions of the reaction 2. However, above this sodium phenolate zone, there is a point where phenol has been completely removed from the oil. As the oil rises above this point, the cresols begin to react with the sodium hydroxide and form sodium cresylate. But since the water solution is moving downward, the cresylate formed in the upper part of the reactor 2 will come in contact in the lower part of the reactor with the oil containing free phenol, and an interchange takes place between the free phenol and the sodium cresylates, whereby the more acid phenol radical displaces the cresylate radical from the sodium cresylate forming sodium phenolate and liberating the free cresols, which pass upwardly with the oil toward the top of the reactor. The water solution overflowing through the overflow pipe 8 will contain substantially sodium phenolate only and little, if any, sodium cresylate. The oil settling at the top of the reactor 2 will contain substantially the cresols only and little, if any, phenol. The oil settling at the top of the reactor 2 is drawn through the pipe 19 by a second pressure pump 20, and is sprayed into the bottom of the reactor 3 through spray nozzles 22 of the same construction as the spray nozzles 12. This oil has been substantially completely washed of its contained phenol. It is treated in the reactor 3 with sodium hydroxide solution from the tank 1, to recover the cresols as sodium cresylate. The washing solution containing the sodium cresylate overflows through the overflow pipe 9, and the oil from which the phenol and cresols is thus recovered settles out at the top of the extractor and escapes through the overflow pipe 21.

The process provides for the continuous selective recovery of phenol and cresols, each substantially uncontaminated with the other. A relatively small sized equipment is required for a given output. The reaction efficiency is very high, due to the reaction surface available in the finely divided spray field of the oil as it rises through the washing alkaline solutions, and also due to the countercurrent movements of the spray and washing solution. The apparatus can be adjusted for continuous operation and requires but little attention. The details of the apparatus and the process of using the submerged spray are described and claimed in their general applications in my copending application, Serial No. 684,164, filed January 3, 1924.

While sodium hydroxide is preferred for the alkaline solutions, other alkaline substances may be employed, as for example, potassium hydroxide.

The present invention is not limited to the preferred details in the mode of operation or apparatus employed, but may be otherwise embodied within the scope of the following claims.

I claim:

1. The process of selectively recovering phenol and cresols from their containing oils comprising continuously washing a stream of the oil with an alkaline solution containing approximately the amount of alkali requisite to recover the phenol only as an alkali metal phenolate, and thereafter washing the stream of oil with a second alkaline solution to recover the cresols as alkali metal cresylate.

2. The process of selectively recovering phenol and cresols from their containing oils, comprising passing the oil upwardly in the form of a spray through an alkaline solution containing approximately the amount of alkali requisite to recover the phenol only as an alkali metal phenolate, and thereafter again passing the oil upwardly in the form of a spray through an alkaline solution to recover the cresols as alkali metal cresylate.

3. The process of selectively recovering phenol and cresols from their containing oils, comprising continuously passing a stream of the oil through an alkaline solution containing approximately the amount of alkali requisite to recover the phenol only as an alkali metal phenolate, and thereafter continuously passing the stream of oil through a second alkaline solution to recover the cresols as alkali metal cresylate.

4. The process of selectively recovering phenol and cresols from their containing oils, comprising continuously washing a stream of the oil with a countercurrent stream of an alkaline solution containing approximately the amount of alkali requisite to recover the phenol only as an alkali metal phenolate, and thereafter continuously washing the stream of the oil with a second countercurrent stream of an alkaline solution to recover the cresols as alkali metal cresylate.

5. The process of selectively recovering phenol and cresols from their containing oils, comprising continuously passing a stream of the oil upwardly and countercurrent through a descending stream of an alkaline solution containing approximately the amount of alkali requisite to recover the phenol as an alkali metal phenolate, and thereafter continuously passing the stream of the oil upwardly and countercurrent through a second descending stream of an alkaline solution to recover the cresols as alkali metal cresylate.

6. The process of selectively recovering phenol and cresols from their containing oils, comprising passing a stream of an alkaline solution downwardly through a reactor and passing a stream of the oil upwardly through the alkaline solution in the reactor in the form of a submerged spray, and regulating the feed of said stream so that the solution as it leaves the reactor contains substantially the alkali metal phenolate only and the oil as it leaves the reactor contains cresols but substantially no phenol.

7. The process of selectively recovering phenol and cresols from their containing oils, comprising continuously washing a stream of the oil with an alkaline solution in amounts so regulated that after washing the solution contains substantially the alkali metal phenolate only and the oil contains cresols but substantially no phenol.

8. The process of selectively recovering phenol and cresols from their containing oils, comprising continuously washing a stream of the oil with a counter current stream of an alkaline solution to recover the phenol as alkali metal phenolate, and regulating the feed of said streams so that after washing the solution contains substantially the alkali metal phenolate only and the oil contains cresols but substantially no phenol, and thereafter continuously washing the stream of oil with a second counter current stream of an alkaline solution to recover the cresols as alkali metal cresylate.

In testimony whereof I have hereunto set my hand.

ROBERT M. CRAWFORD.